April 23, 1963 W. KADEN ETAL 3,086,433
AUTOMATIC CAMERAS
Filed Oct. 21, 1960 3 Sheets-Sheet 1

INVENTOR.
WILLY KADEN
ALFRED WINKLER
BY

April 23, 1963 W. KADEN ETAL 3,086,433
AUTOMATIC CAMERAS
Filed Oct. 21, 1960 3 Sheets-Sheet 3

INVENTOR.
WILLY KADEN
ALFRED WINKLER
BY
Attorney

3,086,433
Patented Apr. 23, 1963

3,086,433
AUTOMATIC CAMERAS
Willy Kaden and Alfred Winkler, Munich, Germany, assignors to Agfa Aktiengesellschaft, Leverkusen-Bayerwerk, Germany
Filed Oct. 21, 1960, Ser. No. 64,081
Claims priority, application Germany Oct. 29, 1959
24 Claims. (Cl. 95—10)

The present invention relates to cameras.

More particularly, the present invention relates to automatic cameras which are capable of automatically determining the exposure time and exposure aperture in order to provide in a fully automatic manner a proper exposure.

Although cameras of this general type are known, they suffer from several defects. Thus, the construction of these cameras is extremely complex and expensive. It is necessary to manufacture the parts with great precision, and even with precision manufacture the slightest amount of tolerances in the various elements which cooperate with each other results in an addition of these tolerances from one element to the next giving a considerable inaccuracy. Because of the complicated structure of conventional cameras of this type they are subject to frequent failures in operation. Moreover, it is desirable to be able to operate such automatic cameras manually at the option of the operator, and the provision of a manual as well as automatic operation raises further difficulties in the manufacture of such cameras.

It is accordingly an object of the present invention to provide a camera of the above type which is extremely simple and relatively inexpensive to manufacture.

Another object of the present invention is to provide a camera of the above type in which only a single element determines the settings of the exposure aperture and exposure time, so that only this one element need be manufactured with precision and so that even where tolerances are provided there will be no addition of tolerances along a train of cooperating elements to provide a great inaccuracy.

Yet another object of the present invention is to provide a camera of the above type capable of indicating in a very simple way to the operator whether or not the camera is capable of making a proper exposure under the prevailing lighting conditions.

A further object of the present invention is to provide for a camera of the above type a means which will enable the camera to be manually set for making an exposure different from that which would be made automatically for the prevailing conditions.

Still another object of the present invention is to provide a camera of the above type which can be manually set for either automatic operation or flash operation.

The objects of the present invention also include the provision of a camera capable of accomplishing all of the above objects and at the same time composed of simple rugged elements which are very reliable in operation.

With the above objects in view the invention includes in an automatic exposure control assembly for cameras, a support means and a lever means turnably carried by the support means. This lever means in accordance with the present invention has an exposure time determining portion, and exposure aperture determining portion, and a sensing portion. All of these portions of the lever means are rigidly connected with each other and the lever means forms a unitary member. The support means also carries a light-responsive means which cooperates with the sensing portion of the lever means to determine the angular position thereof for making an exposure.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
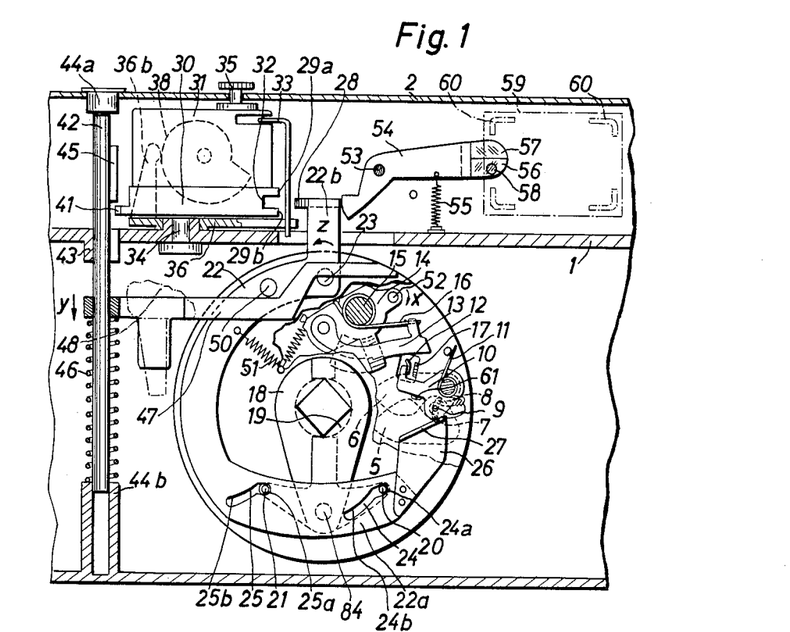
FIG. 1 is a fragmentary, partly sectional front elevation of a camera with its front wall removed so as to illustrate the structure of the invention.
Figure 2:
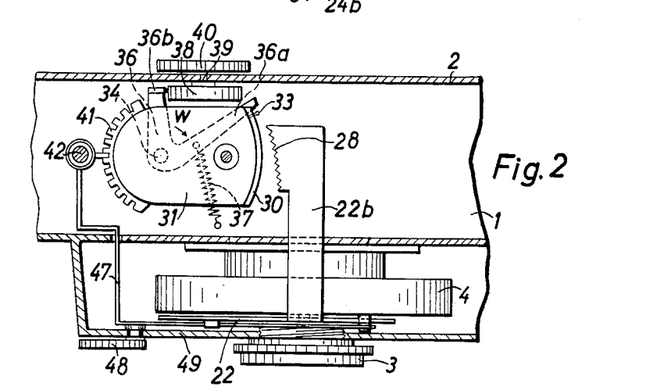
FIG. 2 is a fragmentary, partly sectional top plan of the camera of FIG. 1 with the top wall of the camera removed so as to show the structure beneath this top wall.

Referring now to FIGS. 1 and 2 of the drawings, there is fragmentarily illustrated therein a camera which includes the camera housing 1 carrying at its upper portion a cap 2 beneath which are housed various units such as the viewfinder, range finder, and the like, as is conventional. FIG. 2 shows the objective 3 as well as the shutter housing 4 of the camera.

Figure 3:
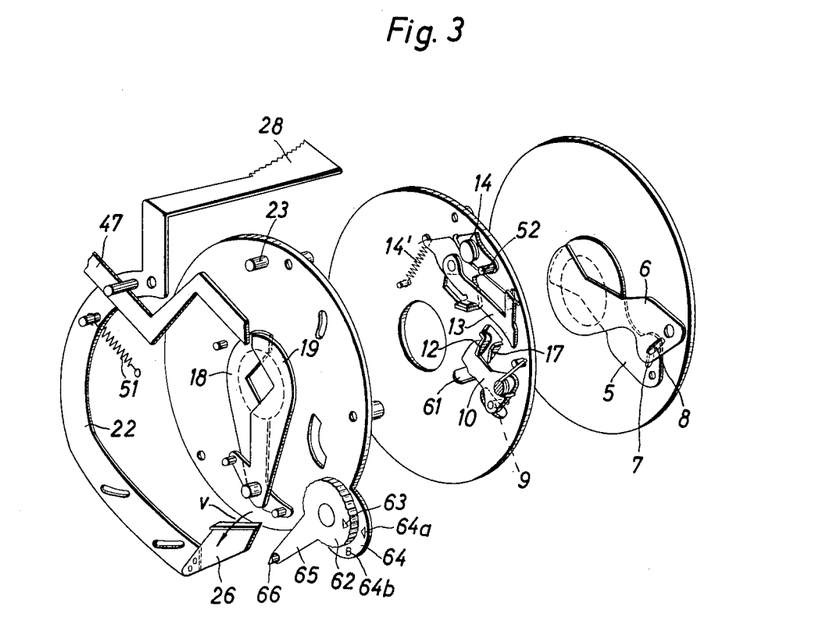
FIG. 3 is a perspective illustration of part of the structure of FIG. 1 shown in an exploded view, FIG. 3 including also structure in addition to that of FIG. 1 for rendering the camera suitable for use with flash operation.

The shutter of the camera is an automatic shutter and includes a pair of shutter blades 5 and 6 which are shown clearly in FIG. 3 and which are indicated in dotted lines in FIG. 1. The wall which is shown at the right of FIG. 3 carries a pair of pins which respectively turnably support the shutter blades 5 and 6 for turning movement respectively in opposite directions about a pair of axis, respectively, which are parallel to the optical axis, and FIG. 3 shows the openings at the right ends of the blades 5 and 6 for receiving the pair of pins which support these blades for turning movement. As is indicated in dotted lines in FIG. 1 and as is shown in FIG. 3, the blades 5 and 6 are respectively formed with slots 7 and 8 which overlap each other, and a pin 9 extends into both of the slots 7 and 8. The pin 9 is fixed to a shutter driving lever 10 which is common to both of the shutter blades 5 and 6, and upon turning of the lever 10 the pin 9 will turn so as to act on the slots 7 and 8 for turning the shutter blades 5 and 6.

As is apparent from FIGS. 1 and 3, the shutter drive means 10 is turnably supported by the intermediate circular wall shown in FIG. 3 through a suitable pivot pin, and a wire spring 11 is coiled about this pivot pin, engages with one end against a stationary stop member carried by the intermediate wall of FIG. 3, and with its opposite end engages a lug of the lever 10 so as to urge the latter in a clockwise direction, as viewed in FIG. 1. Thus, the pin 9 seeks to turn the blade 6 in a clockwise direction and the blade 5 in a counterclockwise direction, as viewed in FIG. 3, and in the rest position of the parts the pin 9 is located at the overlapping ends of the slot 7 and 8 shown in FIG. 3, so that the pin 9 cannot turn in a clockwise direction beyond the position indicated in FIG. 1, and in this way the rest position of the lever 10 under the influence of the spring 11 is determined, as well as the closed position of the shutter 5, 6. The shutter driving lever 10 includes a rigid projection 12 located in the path of turning of a swing lever 13 which is adapted to engage the projection 12 with impact in the manner described below for turning the lever 10 in opposition to the spring 11 for actuating the shutter in order to make an exposure.

The swing lever 13 is pivotally carried by a shutter tensioning and release lever 14, and as is apparent from FIGS. 1 and 3 the lever 13 is pivotally supported at its left end, as viewed in FIGS. 1 and 3, on the lever 14.

This lever 14 is itself pivotally supported by stationary pin 15 fixedly carried by the intermediate wall of the assembly shown in FIG. 3. A spring 14' is fixed at one end to the intermediate wall shown in FIG. 3 and at its opposite end to the left end of the lever 14, as viewed in FIGS. 1 and 3, so as to urge this lever 14 in a counterclockwise direction about the pivot pin 15 to the illustrated rest position of the lever 14. An unillustrated stop member is carried by the intermediate wall of FIG. 3 and engages an upper edge of the lever 14, as viewed in FIGS. 1 and 3, for determining the rest position of the lever 14 under the influence of the spring 14'.

A wire spring 16 is coiled about the pin 15, has one end hooked onto a notch formed in the upper edge of the lever 14, as viewed in FIGS. 1 and 3, and the other end of the wire spring 16 extends into a hook carried by the lever 13 at its right free end, as viewed in FIGS. 1 and 3, so that the spring 16 urges the lever 13 to turn in a clockwise direction with respect to lever 14 as viewed in FIGS. 1 and 3. It will be seen that the lever 14 is provided along its lower edge with a lug extending substantially parallel to the optical axis, and the lever 13 is provided along its lower edge, as viewed in FIGS. 1 and 3 with a similar lug engaging the lug of the lever 14 so that in this way the turning of the lever 13 with respect to the lever 14 is limited.

The intermediate circular wall which is shown in FIG. 3 fixedly carries a lug 17 which is located in the path of turning of the lever 13 when the latter turns with the lever 14 in a clockwise direction about the pin 15, this direction of turning being indicated at $x$ in FIG. 1. As will be apparent from the description below, the lever 14 is turned in its shutter cocking and releasing direction by a member which engages the pin 52 fixed to the lever 14 and which moves this pin 52 downwardly, as viewed in FIGS. 1 and 3. During this downward movement of the pin 52 the lever 14 will be turned in opposition to the spring 14', and the lower edge of the lever 13 will engage the lug 17 at its upper edge and adjacent to the right free end of the lever 13. During the continued turning of the lever 14 in opposition to the spring 14', the lever 13 will remain in engagement with the projection 17 and will not turn with the lever 14 so that as a result the spring 16 is tensioned by this continued turning of the lever 14. During this continued turning of the lever 14 which results in tensioning of the spring 16, the pivot pin which connects the lever 13 to the lever 14 moves to a greater distance away from the projection 17 so that the right free end of the lever 13 approaches the upper edge of the lever 17, and the lever 13 is released when its right free end rides off the upper edge of the projection 17. At this point, which is the point of shutter release, the spring 16 has been tensioned to such a degree that it is more powerful than the spring 11. Thus, at the instant when the lever 13 rides off the projection 17 it will strike the projection 12 with an impact sufficient to turn the lever 10 in opposition to the spring 11 and thus the blades 5 and 6 will be actuated so as to open the shutter.

A timing means is provided for controlling the time during which the shutter remains open, and this timing means includes the projection 61 which is fixed to and projects from the lever 10, FIG. 3, showing at the front circular wall an arcuate slot through which the projection 61 extends so as to cooperate in a manner described below with a stop member which determines the extent of movement of the projection 61 and thus determines the exposure time. Thus, if the projection 61 is free to turn through a relatively long path the shutter will remain open for a relatively long time, while if the path of movement of the timing element 61 is limited the shutter will remain open for a shorter period of time. As soon as the movement of the lever 10 in a counterclockwise direction, as viewed in FIG. 1, in opposition to the spring 11 under the impact of the lever 13 is terminated by engagement of the timing means 61 with a stop as described below, the spring 11 is capable of immediately returning the lever 10 to the position shown in FIG. 1 so as to immediately close the shutter, the spring 16 at this time being of a lesser force than the spring 11 so that the latter immediately causes the shutter to be closed. During the return of the lever 14 by the spring 14' to the position shown in FIG. 1 in a direction opposite to that indicated by the arrow $x$ in FIG. 1, the lug at the lower edge of the lever 14 will engage the lug at the lower edge of the lever 13 so as to move the latter back with the lever 14 to the position shown in FIG. 1, and it will be noted that the lever 13 will just prior to its turning by the lever 14 be in engagement with the projection 12 which is in the position of FIG. 1 when the shutter has closed. It should also be noted that the projection 17 has, as shown clearly in FIG. 3, a lower front edge portion which is inclined downwardly toward the rear of the camera so that when the projection 12 returns with the lever 10 to the rest position shown in FIGS. 1 and 3, the projection 12 will engage and turn the lever 13 back toward its rest position, and during this turning the lever 13 can ride over the front edge of the projection 17.

The diaphragm which determines the exposure aperture of the camera includes in the embodiment of FIGS. 1–3 a pair of diaphragm blades 18 and 19 which overlap each other and which are turnable about a common axis formed by the pivot pin 84 which is fixedly carried by the front circular wall shown in FIG. 3 and which passes through a pair of aligned openings of the overlapping diaphragm blades 18 and 19. These blades are formed at their edges which overlap with substantially V-shaped notches so as to form the aperture indicated in FIGS. 1 and 3. The blades 18 and 19 respectively fixedly carry the pins 20 and 21 which are acted upon in the manner described below for setting the aperture of the camera.

In accordance with the present invention a unitary lever means 22 is provided for controlling both the exposure time and the exposure aperture, and this lever means 22 is unitary in the sense that all of its parts or portions are rigidly connected to each other so that in effect the lever means 22 is in the form of a single lever member. The lever means 22 is in the form of a two-armed lever which is pivotally supported by the pivot pin 23 which is carried by the front circular wall shown in FIG. 3 and this latter wall forms part of the support means of the camera, so that the support means supports the lever means 22 for turning movement about the axis of the pivot pin 23 which extends parallel to the optical axis but is spaced therefrom. It will be noted that the lower arm of the lever 22, as viewed in FIG. 1, is of substantially arcuate configuration and extends through something more than 180° around the optical axis. This lower arm 22a of the lever 22 has an exposure aperture determining portion which is formed with a pair of slots 24 and 25 respectively receiving the pins 20 and 21, so that these pins and slots form a pin-and-slot means interconnecting the lever means 22 with the diaphragm means 18, 19. The slots 25 and 24 respectively have upper portions 25a and 24a as viewed in FIG. 1, which respectively extend along an arc of a circle whose center is in the axis of the pin 23, and these slots respectively have the portions 24b and 25b which are inclined with respect to the portions 24a and 25a, respectively, as is evident from FIG. 1.

The arm 22a of the lever means 22 also has an exposure time determining portion, and this latter portion is formed by the element 26 which is riveted to the remainder of the lever 22 so as to rigidly be connected therewith. This element 26 has an upper portion 27 which is in a plane parallel to the optical axis and perpendicular to the plane in which the remainder of the element 26 is located, and this element 27 forms a control surface of the element 26 which forms a stop member adapted to be located in the path of turning of the timing means 61 so as to control the exposure time in a manner described above. Thus, the nearer the element 26 is located to the projection 61, the smaller will be the path of movement of the latter, and thus the smaller the exposure time. The element 26 is in the form of a leaf spring for a purpose described below in connection with FIG. 3. A spring 51 is connected at one end to a stationary pin to which the lower end of this spring 14' is also connected, and this spring 51 is connected at its opposite end to the lever 22 so as to urge the latter to turn in the direction of the arrow $z$ shown in FIG. 1, and when the lever 22 is turned in this direction by the spring 51 the stop 26 will be positioned so as to control the exposure time and the slots 24 and 25 will move with respect to the pins 20 and 21, respectively, so as to determine the exposure aperture.

The upper arm 22b of the lever means 22 of the invention extends first upwardly from the pivot pin 23 in a plane perpendicular to the optical axis and then rearwardly in the space within the cap 2 in a plane parallel to the optical axis. At its free end shown most clearly in FIG. 2 the arm 22b of the lever means 22 has a sensing portion provided with a left scanning edge 28, as viewed in FIG. 2, which is toothed. This sensing portion cooperates with a light-responsive means in a manner described below for determining the angular position of the lever 22 in accordance with the lighting conditions so as to automatically set the camera for making a proper exposure.

The light-responsive means is formed by an electrical instrument 31 in the form of a galvanometer, for example, and the rotor of this instrument is turned in response to current generated by the light which impinges on a photocell electrically connected with the galvanometer 31 in a conventional, well-known manner. The light-responsive means 31 is supported by a carrier 30 and includes a movable pointer 33 which turns with the rotor of the electrical instrument and which has a downwardly directed free end portion, as viewed in FIG. 1. Thus the pointer 33 forms an element of the light-responsive means which will automatically assume a position determined by the lighting conditions and which is located in the path of movement of the scanning edge. This downwardly directed free end portion of the pointer 33 will move along an arcuate path, and the carrier 30 fixedly carries a stationary jaw means located along the path of turning of the pointer 33 at its lower vertical portion. This stationary jaw means is formed by the pair of parallel spaced stationary jaw members 29a and 29b which are rigidly fixed with the carrier 30 and which define between themselves the space 32 which is located at the same elevation as the sensing portion of the lever means of the invention. The thickness of the space 32 is somewhat greater than the thickness of the sensing portion of the lever means so that this sensing portion can enter freely into the space 32 between the stationary jaws 29a and 29b. Thus, the edge 28 in addition to forming an edge which engages the pointer 33 to sense the position of the latter also forms a movable jaw which cooperates with the stationary jaws 29a and 29b to form a clamping means for clamping the pointer and preventing movement thereof while it is sensed by the sensing portion of the lever means of the invention. In the rest position of the lever means 22 shown in FIGS. 1 and 2, the pointer 33 can move freely in the space between the stationary jaw means 29a, 29b, and the movable jaw means 28. However, when the lever 22 is released to the spring 51 the movable jaw means will move into the space 32 and the pointer will be clamped between the movable and the stationary jaw means, so that in this way the lever means senses the angular position of the pointer 33 and assumes an angular position determined by the lighting conditions.

The carrier 30 is turnably supported by a stationary pin 34 which is fixedly carried by the support means formed by the camera housing itself in this case, and the upper wall of the electrical instrument 31 is fixed to a pin which extends vertically through an arcuate slot formed in the upper wall of the cap 2. This arcuate slot has its center of curvature located in the axis of the pin 34, and at the exterior of the cap 2 a knob 35 is fixed to the pin which is fixed to the instrument 31 so that the operator can grasp the knob 35 to turn the instrument 31 to a desired angular position with respect to the axis of the pin 34. The upper wall of the cap 2 is provided at its exterior with a scale extending along this arcuate slot, and this scale indicates various film speeds. The knob 35 carries an index which cooperates with graduations of the scale so that in this way it is possible for the operator to set the instrument 31 at an angular position which will take into consideration the speed of the film which is used in the camera.

Directly beneath the carrier 30 but completely separate therefrom is a bell crank 36 which is supported for turning movement about the axis of the pin 34, this bell crank being pivotally supported either by the pin 34 itself or by the bearing which surrounds the pin 34. The bell crank 36 is freely turnable independently of the carrier 30 and the instrument 51. The arm 36a of the bell crank, as shown in FIG. 2, extends outwardly beyond the pointer 33 so that when the bell crank is turned in the direction of the arrow $w$ shown in FIG. 2, the arm 36a will engage the pointer 33 and will turn the latter independently of the lighting conditions. A spring 37 extends beneath the carrier 30 and is connected at one end to the arm 36a and is connected at its other end to the top wall of the housing 1, so that this spring 37 urges the bell crank 36 to turn in the direction of the arrow $w$ of FIG. 2, and the free end of the other arm 36b of this bell crank extends upwardly and has its right edge, as viewed in FIGS. 1 and 2, maintained by the spring 37 in engagement with the outer periphery of a cam 38 which is fixed to a pin 39 which extends through and is turnably supported by the rear wall of the cap 2. At the exterior of the cap 2 the pin 39 is fixed with a knob 40, so that the operator can turn knob 40 to control the angular position of the cam 38 and thus control the angular position of the bell crank lever 36. The knob 40 carries an index which moves along an unillustrated scale located at the rear exterior surface of the cap 2 and indicating light values for various films speeds, so that the operator can set the knob 40 and thus cam 38 at a preselected light value. If desired, instead of a scale of light values the index of the knob 40 may cooperate with a flash lamp scale provided for a predetermined, most frequently used distance of the subject from the camera to be used for flash operation when the camera will operate with a predetermined exposure time in a manner described below in connection with FIG. 3.

The carrier 30 is provided at its left end, as viewed in FIGS. 1 and 2, with a gear sector 41 whose center is in the axis of the pivot 34, and this sector 41 is adapted to cooperate with a projection 45 fixedly carried by a rod 42 which is axially moved in the direction $y$ of FIG. 1 when the operator wishes to make an exposure. The rod 42 is guided by the bearings 44a and 44b, as well as the bearing 43 and when the rod 42 is moved downwardly in a manner described below for causing an exposure to be made, the projection 45 will enter into the space between a pair of teeth of the gear sector 41 so to prevent turning of the instrument 31 during the actual making of an exposure. In the rest position of the part shown in FIG. 1 the projection 45 is located above the gear sector 41 so that the knob 35 may be engaged for setting the angular position of the instrument 31 in accordance with the speed of the film which is used in the camera.

A coil spring 46 is coiled about a lower portion of the rod 42, bears with its bottom end against the upper end of the bearing 44b, and bears with its top end against the under side of an arm 47 which is fixed to the rod 42, so that the spring 46 yieldably maintains the rod 42 in the rest position thereof illustrated in FIG. 1. The arm 47 which is fixed to the rod 42 is bent angularly in the manner shown in FIGS. 1 and 2, and the portion of the arm 47 which is located directly behind the front wall 49 of the camera (FIG. 2) is fixed to a pin which extends through a vertical slot formed in the front wall 49, and at the exterior of the camera this pin is fixed to a manually engageable member 48 capable of being engaged by the operator for moving the arm 47 and thus the rod 42 downwardly in opposition to the spring 46 for making an exposure in a manner described below. The spring 51 which acts on the lever 22 presses a pin 50 which is fixed to the lever 22 against an upper edge of the arm 47, and since the spring 46 is stronger than the spring 51 the lever 22 will be maintained in opposition to the spring 51 in the rest position shown in FIG. 1. The right free end portion of the arm 47, as viewed in FIGS. 1 and 2, is located over the pin 52 of the lever 14, so that during downward movement of the arm 47 it will engage the pin 52 and turn the lever 14 in the direction of the arrow $x$ so as to actuate the shutter of the invention in the manner described above.

As is shown at the upper portion of FIG. 1, a lever 54 is supported intermediate its ends for turning movement by a stationary pin 53 carried by any suitable bracket or the like supported on the upper wall of the housing 1, and this lever 54 is urged in a clockwise direction, as viewed in FIG. 1, by the spring 55. In this way the left free end of the lever 54 is urged against the right edge of the arm 22b of the lever 22, and since the spring 46 is stronger than the total force of the springs 51 and 55, the lever 54 cannot turn under the influence of the spring 55 beyond the position shown in FIG. 1. The lever 54 forms an indicating means for indicating to the operator whether or not a proper exposure can be made, and for this purpose lever 54 has at its right end, as viewed in FIG. 1, a pair of transparent differently colored portions 56 and 57. The arm 22b of the lever 22 maintains the portion 56 before an opening 58 formed in a plate 59, and a stop located beneath the lower edge of the lever 54 to the right of the pin 53 permits the lever 54 to be turned only through an angle which will locate a differently colored portion 57 before the opening 58. This plate 59 is formed with the opening 58 and is also formed with the slots 60 which indicate to the operator the limits of the frame in which the exposure will be made. The portions 56 and 57 are located between a front window of the cap 2 and the plate 59, and behind the plate 59 is located a reflector which directs an image of the openings 60 as well as the opening 58 to a semi-transparent reflector of the viewfinder so that when the operator looks through the viewfinder he will see not only the images of the openings 60 but also the image of the opening 58 and of course this latter image will appear with the color of the indicator portion 56 or the color of the indicator portion 57.

When the above-described camera is used, after the film is inserted into the camera the knob 35 is actuated to place the instrument 31 at an angular position corresponding to the speed of the film which is used in the camera. In order to make an exposure the operator moves the member 48 downwardly so as to move the rod 42 and thus the arm 47 in the direction of the arrow $y$ of FIG. 1. In this way the projection 45 will cooperate with the gear sector 41 to prevent turning of the instrument 31. Simultaneously, the lever 22 is released to the spring 51 which turns the lever 22 in the direction of the arrow $z$. This turning of the lever 22 will continue until the sensing portion of the lever engages at its edge 28 the pointer 33 and clamps the latter between the edge 28 and the jaws 29a and 29b.

The initial part of the turning of the lever 22 influences neither the diaphragm nor the shutter. Since during the initial part of turning of lever 22 the portions 24a and 25a of the slots 24 and 25 move with respect to the pins 20 and 21, respectively, the diaphragm blades 18 and 19 will not be actuated. Moreover, in the rest position of the lever 22 shown in FIG. 1, the portion 26 of the lever 22 is located slightly beyond the range of turning of the projection 61 so that during this initial portion of the turning of the lever 22 the exposure time will also remain uninfluenced. This initial part of the turning of the lever 22 during which neither the exposure time nor the exposure aperture will be influenced terminates as soon as the edge 28 has reached the point where a proper exposure can be made with the smallest permissible amount of light. Continued turning of the lever 22 will place the portion 26 thereof to an increasing extent in the path of movement of the timing means 61 so as to continuously reduce the exposure time. During this initial reduction in the exposure time the diaphragm still remains uninfluenced since the pins 20 and 21 are still located in the portions 24a and 25a of the slots 24 and 25. Only when there is even more intensity of light prevailing will the portions 24b and 25b of the slots 24 and 25 engage the pins 20 and 21 so as to act through the latter on the diaphragm blades for turning the latter so as to reduce the exposure aperture.

During the last portion of the downward movement of the element 48 and thus of the arm 47, this arm will engage the pin 52 so as to turn the lever 14 and thus actuate the shutter in the manner described above so as to make an exposure.

During the turning of the lever 22 in the direction of the arrow $z$, the right edge of the arm 22b moves away from the lever 54 so that the latter is released to the spring 55. The arrangement is such that during the initial turning of the lever 22 the portion 56 which may be red, for example, is located in front of the opening 58 so that the operator sees only the red color and will know that a proper exposure cannot be made. Only when the lever 22 has turned through such an angle that a proper exposure can be made will the portion 57, which may, for example, be green, be located in front of the opening 58, and when the operator sees the green color he knows that a proper exposure can be made. The portion 57 of the indicator will be located in front of the opening 58 only when the pointer 30 is at such an angle that the edge 28 can engage the pointer 30 to make a proper exposure.

Upon release of the manually engageable member 48 the spring 46 will return the arm 47 and the rod 42 to their rest position shown in FIG. 1, and thus the projection 45 moves away from the gear sector 41 and the arm 47 engages the pin 50 to return the lever 22 in opposition to the spring 51 to the rest position shown in FIG. 1. Simultaneously the arm 47 moves away from the pin 52 so that the lever 14 can be returned by the spring 14' to the illustrated rest position. Also, during the last portion of the return movement of the lever 22 its arm 22b will engage the left end of the lever 54 to turn the latter in opposition to the spring 55 in the position shown in FIG. 1. In addition, it will be noted that the slots 24 and 25 cooperate with the pins 20 and 21 to return the diaphragm to its starting position.

Under certain circumstances it may be desirable to operate the camera with a combination of exposure time and exposure aperture which is not determined by the prevailing lighting conditions, and for this purpose the knob 40 is turned by the operator to set this knob at a light value which will give a combination of exposure time and exposure aperture according to the will of the operator instead of according to the lighting conditions. The turning of the knob 40 will act through the cam 38 on the lever 36 to turn the arm 36a thereof for manually placing the pointer 33 in an angular position selected by the operator, and now when the element 40 is actuated the angular position of the lever 22 will be determined by the manually determined position of the pointer 33 so that the exposure will be made according to an exposure time and exposure aperture selected by the operator.

The embodiment of the invention which is illustrated in FIG. 3 includes all of the structure described above and in addition a structure which is capable of setting the camera for flash operation. Thus, as may be seen from FIG. 3, the front circular wall is provided with a projection carrying the symbols 64a and 64b at the projection 64 of this front wall, and in addition this front wall carries a turnable indicator 63 capable of being manually turned by the operator and also visible to the operator at the front of the camera. This turnable member 62 which is provided with the index 63 has a radially extending arm 65 provided with a projection 66 which has an inclined surface adapted to be engaged by the element 26. When the element 62 is manually turned to a position aligning the index 63 with the symbol 64b, the inclined surface of the projection 66 will engage the stop 26, and since this stop 26 is in the form of a leaf spring it will be turned forwardly in the direction of the arrow v shown in FIG. 3. The extent to which the spring 26 is turned forwardly by the projection 66 at this time is sufficient to locate the leaf spring 26 beyond the projection 61 of the lever 10, so that when the camera is set for flash operation the exposure time of the camera will be uninfluenced by the angular position of the lever 22. When it is desired to operate the camera automatically as described above the index 63 is aligned with the symbol 64a in the manner shown in FIG. 3, and all of the parts will operate in the manner described above. The construction of the shutter is such that when its operation is uninfluenced by the projection 26 it will have a maximum exposure time of 1/30 of a second, for example, and flash operation of the camera is set to accommodate this exposure time of 1/30 of a second. Thus, when the camera is set for flash operation, the lever 22 upon being turned by the spring 51 will have its leaf spring portion 26 ride up the inclined surface of the projection 66 so that the portion 26 will be located beyond the projection 61 and will not be able to influence the exposure time.

Figure 4:
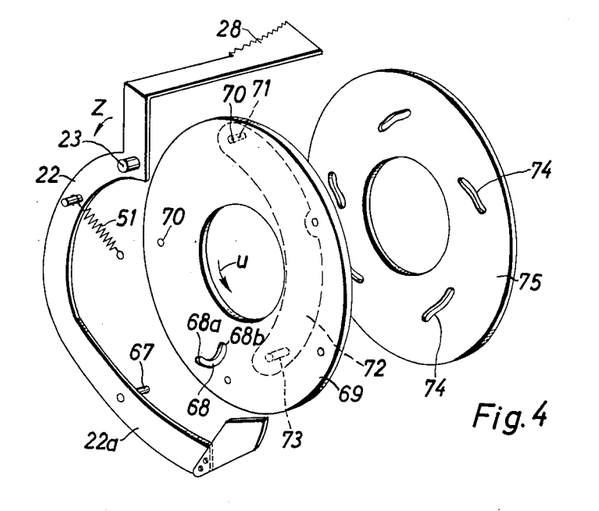
FIG. 4 is a perspective exploded view of another embodiment of a diaphragm structure of the invention.

The embodiment of the invention which is illustrated in FIG. 4 differs from the embodiment of FIG. 1 in that this embodiment includes an iris-type diaphragm. The arm 22a of the lever 22 in this embodiment carries a pin 67, so that the pin 67 turns with the lever 22 when the latter is turned by the spring 51 about the pin 23. This pin 67 extends into a guide slot 68 of a turnable control ring 69 which is supported for rotary movement about the optical axis which coincides with the axis of the ring 69. The slot 68 has a portion 68a which extends along an arc of a circle whose center is in the axis of the pivot pin 23, and the continuation 68b of the portion 68a is inclined with respect to the portion 68a in the manner shown in FIG. 4. The ring 69 is provided with a plurality of bores 70 in which a plurality of pivot pins 71 are respectively fixed, and these pivot pins 71 serve to pivotally support the blades 72 of the diaphragm, only one of these blades being shown in dotted lines in FIG. 4 for the sake of clarity. Each of the blades 72 fixedly carries a pin 73, and the several pins 73 respectively extend through the curved slots 74 of a stationary plate 75 which cooperates with the pins 73 upon turning of the ring 69 for controlling the size of the exposure aperture. The diaphragm of FIG. 4 will operate to produce the same results as the diaphragm of FIG. 1. During the initial part of the turning of lever 22 in the direction of the arrow z, the pin 67 will turn along portion 68a of the slot 68 so that the diaphragm is not actuated. During a part of the turning of the pin 67 along the slot portion 68a the exposure time will be regulated, however, as was pointed out above. During further turning of the lever 22 the pin 67 reaches the portion 68b of the slot 68 and thus turns the diaphragm control ring 69 in the direction of the arrow u shown in FIG. 4, and as a result the diaphragm blade 72 will be actuated to provide the proper diaphragm aperture.

Figure 5:
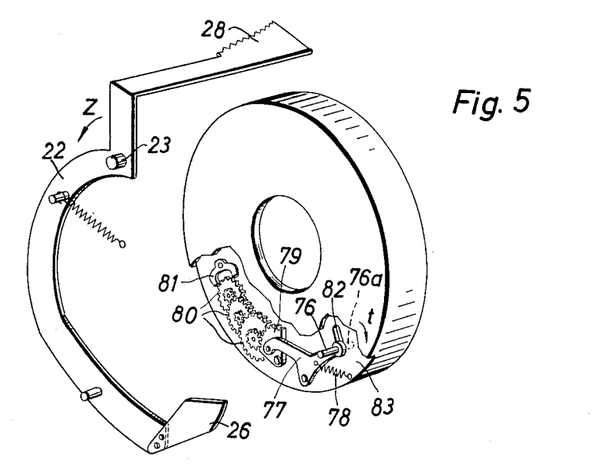
FIG. 5 is a perspective exploded view of another embodiment of an exposure time determining structure.

According to the embodiment of the invention which is illustrated in FIG. 5, the automatic shutter structure described above is replaced by a shutter of a more conventional construction as shown in FIG. 5. Thus, when the lever 22 turns in the direction of the arrow z about the pin 23, the projection 26 engages a pin 76. This pin 76 controls the exposure time. The pin 76 is carried by a lever 77 which is turnably supported intermediate its ends and which is urged by the spring 78 in the direction of the arrow t shown in FIG. 5. The left end of the lever 77, as viewed in FIG. 5, is pivotally connected with a gear sector 79 which forms the first of a train of gear elements 80 forming the retarding or delaying mechanism which will produce the desired exposure time. This gear train 80 terminates in an escapement wheel which cooperates with the escapement anchor 81 so as to delay the running down of the shutter. The structure shown at the lower portion of the shutter housing of FIG. 5 is supported by plate 83 which is formed with a slot 82 through which a portion 76a of the pin 76 extends. This portion 76a of the pin 76 is engaged in a known way by a main shutter driving member which moves the pin 76a in a direction opposite to the direction indicated by the arrow t. The extent to which the retarding means 79—81 will act through the lever 77 on the pin 76 to retard the running down of the shutter will be determined by the path through which the main driving member must move the pin 76 along the slot 82. Thus, in the position of the part shown in FIG. 5 the pin 76 must be moved along the entire length of the slot 82 so that the maximum exposure time will be provided.

When the light intensity is sufficient to require less than the maximum exposure time, the projection 26 will engage the pin 76 and move the latter along the slot 82 so that the main drive member of the shutter will be required to move the pin 76 through a lesser distance and will be able to turn freely through a longer distance before engaging the pin portion 76a, and thus the exposure time will be reduced. When there is so much light available that the maximum light intensity for a proper exposure is present, the pin 76 will be located by the projection 26 at the upper end of the slot 82, as viewed in FIG. 5, and in this position of the pin 76 the main shutter driving member can run freely without being retarded in any way so that the shortest possible exposure time is provided.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion which includes a scanning edge, all of said portions of said lever means being rigidly connected to each other and said lever means forming a unitary member; and light-responsive means carried by said support means and including an element automatically assuming a position determined by the lighting conditions and located in the path of movement of said scanning edged sensing portion of said lever means for determining the angular position of said lever means prior to exposure of film in the camera.

2. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion which includes a scanning edge, all of said portions of said lever means being rigidly connected to each other and said lever means forming a unitary member; and light-responsive means carried by said support means and including an element automatically assuming a position determined by the lighting conditions and located in the path of movement of said scanning edged sensing portion of said lever means for determining the angular position of said lever means prior to exposure of film in the camera, said lever means being in the form of a two-arm lever and said support means supporting said lever for turning movement about an axis spaced from but parallel to the optical axis of the camera.

3. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; and light-responsive means cooperating with said sensing portion of said lever means for determining the angular position of said lever means prior to exposure of film in the camera, said light-responsive means being carried by said support means and responding to the lighting conditions for determining the angular position of said lever means, said lever means being in the form of a two-arm lever and said support means supporting said lever for turning movement about an axis spaced from but parallel to the optical axis of the camera and said lever means having one arm of substantially arcuate configuration extending through more than 180° about the optical axis.

4. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; and light-responsive means cooperating with said sensing portion of said lever means for determining the angular position of said lever means prior to exposure of film in the camera, said light-responsive means being carried by said support means and responding to the lighting conditions for determining the angular position of said lever means, said light-responsive means including a movable pointer; stationary clamping jaw means located along the path of movement of said pointer, and said sensing portion of said lever means having an edge portion which forms a movable jaw of the pointer clamping means and being movable upon turning of said lever means into engagement with said pointer for pressing the latter against said stationary jaw for determining the setting of said lever means when making an exposure and for holding said pointer stationary during the making of an exposure.

5. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; and light-responsive means cooperating with said sensing portion of said lever means for determining the angular position of said lever means prior to exposure of film in the camera, said light-responsive means being carried by said support means and responding to the lighting conditions for determining the angular position of said lever means, said light-responsive means being in the form of an electrical instrument and a carrier therefor, and said electrical instrument including a movable pointer whose position is determined by the lighting conditions; stationary clamping jaw means fixed to said carrier and located along the path of movement of said pointer, said sensing portion of said lever means having an edge which forms a movable jaw means and which engages said pointer and presses the same against said stationary jaw means for clamping said pointer between said stationary and movable jaw means and for determining the angular position of said lever means when making an exposure.

6. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means, said light-responsive means being in the form of an electrical instrument and a carrier therefor, and said electrical instrument including a movable pointer whose position is determined by the lighting conditions; and stationary clamping jaw means fixed to said carrier and located along the path of movement of said pointer, said sensing portion of said lever means having an edge which forms a movable jaw means and which engages said pointer and presses the same against said stationary jaw means for clamping said pointer between said stationary and movable jaw means and for determining the angular position of said lever means when making an exposure, said stationary jaw means including a pair of spaced parallel jaws and said sensing portion of said lever being movable into the space between said stationary jaws.

7. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; diaphragm means for providing the exposure aperture; and pin-and-slot means interconnecting said diaphragm means with said exposure aperture determining portion of said lever means for transmitting movement of said lever means to said diaphragm means for setting the exposure aperture thereof.

8. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; diaphragm means for providing the exposure aperture; and pin-and-slot means interconnecting said diaphragm means with said exposure aperture determining portion of said lever means for transmitting movement of said lever means to said diaphragm means for setting the exposure aperture thereof, said diaphragm means including a plurality of diaphragm blades, and said pin-and-slot means including a plurality of pins respectively fixed to said blades and a plurality of slots formed in said exposure aperture determining portion of said lever means and respectively receiving said pins.

9. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion which includes a scanning edge, all of said portions of said lever means being rigidly connected to each other and said lever means forming a unitary member; light-responsive means carried by said support means and including an element automatically assuming a position determined by the lighting conditions and located in the path of movement of said scanning edged sensing portion of said lever means for determining the angular position of said lever means prior to exposure of film in the camera; shutter means; and timing means cooperating with said shutter means for controlling the length of time that said shutter means remains open during an exposure, said exposure time determining portion of said lever means cooperating with said timing means for influencing the operation thereof to set the exposure time.

10. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; shutter means; and timing means cooperating with said shutter means for controlling the length of time that said shutter means remains open during an exposure, said exposure time determining portion of said lever means cooperating with said timing means for influencing the operation thereof to set the exposure time, said shutter means including at least one shutter blade, drive means cooperating with said blade for moving the same between open and closed positions, and said timing means including a projection fixed to said drive means for movement therewith, said exposure time determining portion of said lever means being in the form of a stop located in the path of movement of said projection for determining the extent of movement of said drive means and thus determining the exposure time.

11. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of the said lever means; shutter means; and timing means cooperating with said shutter means for controlling the length of time that said shutter means remains open during an exposure, said exposure time determining portion of said lever means cooperating with said timing means for influencing the operation thereof to set the exposure time, said shutter means including a pair of shutter blades, a common driving lever common to said blades and operatively connected therewith for moving the same, and said timing means including a projection fixed to said lever, said exposure time determining portion of said lever means being in the form of a stop located in the path of movement of said projection for determining the extent of movement of said driving lever and thus determining the exposure time.

12. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion which includes a scanning edge, all of said portions of said lever means being rigidly connected to each other and said lever means forming a unitary member; and light-responsive means carried by said support means and including an element automatically assuming a position determined by the lighting conditions and located in the path of movement of said scanning edged sensing portion of said lever means for determining the angular position of said lever means prior to exposure of film in the camera, said exposure time and exposure aperture determining portions of said lever means simultaneously determining the exposure time and exposure aperture in a stepless manner.

13. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; diaphragm means for providing the exposure aperture of the camera and including diaphragm blades and a plurality of pins fixed to and extending therefrom, respectively, said exposure aperture determining portion of said lever means including a plurality of slots respectively receiving said pins, and said slots each having a first arcuate portion extending along an arc of a circle whose center is in the turning axis of said lever means and a second portion inclined with respect to said first portion so that during turning of said lever means with said pins respectively located in said first portions of said slots the blades of said diaphragm means will not be influenced.

14. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; and spring means cooperating with said lever means for turning the latter in a direction which determines the exposure of film in the camera, said spring means having its maximum tension when said lever means is in a rest position prior to making an exposure.

15. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; first spring means operatively connected with said lever means for turning the latter from a rest position in a direction which will determine the exposure aperture and exposure time of the camera; manually operable means movable by the operator of the camera for making an exposure, said manually operable means cooperating with said lever means for maintaining the same in said rest position in opposition to said first spring means and said manually operable means itself having a rest position; and second spring means stronger than said first spring means and cooperating with said manually operable means for yieldably maintaining the same in said rest position thereof.

16. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion which includes a scanning edge, all of said portions of said lever means being rigidly connected to each other and said lever means forming a unitary member; light-responsive means carried by said support means and including an element automatically assuming a position determined by the lighting conditions and located in the path of movement of said scanning edged sensing portion of said lever means for determining the angular position of said lever means prior to exposure of film in the camera; automatic shutter means, said exposure time determining portion of said lever means cooperating with said shutter means for determining the exposure time; and manually operable means for making an exposure, said manually operable means having a control arm cooperating with said shutter means for actuating the same when said manually operable means is actuated.

17. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; automatic shutter means, said exposure time determining portion of said lever means cooperating with said shutter means for determining the exposure time; and manually operable means for making an exposure, said manually operable means having a control arm cooperating with said shutter means for actuating the same when said manually operable means is actuated, said shutter means including a shutter tensioning and releasing lever and a projection fixed thereto, and said control arm engaging said projection for actuating said shutter tensioning and releasing lever.

18. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; and indicating means cooperating with said lever means for indicating to the operator that the lighting conditions are favorable or unfavorable for making a proper exposure.

19. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; and indicating means cooperating with said lever means for indicating to the operator that the lighting conditions are favorable or unfavorable for making a proper exposure, said indicating means being in the form of a lever supported intermediate its ends for turning movement by said support means and having indicating portions, said lever means cooperating with said lever for maintaining the latter in a position indicating that a proper exposure will not be made when said lever means is in the vicinity of a rest position from which it moves in order to set the exposure time and exposure aperture of the camera.

20. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; said light-responsive means including an electrical instrument turnably supported by said support means; manually operable means cooperating with said instrument for turning the latter to an angular position according to the speed of the film which is used in the camera; manually operable means for making an exposure; and means cooperating with said manually operable means and said instrument for preventing turning of the latter while said manually operable means is actuated to make an exposure.

21. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means prior to exposure of film in the camera, said light-responsive means being carried by said support means and responding to the lighting conditions for determining the angular position of said lever means; said light-responsive means including a movable pointer engaged by said sensing portion of said lever means for determining the setting of the latter in accordance with the lighting conditions; and manually operable means carried by said support means and cooperating with said pointer for manually moving the latter to a selected position at the option of the operator for providing for said lever means a setting different from that which would be provided by the lighting conditions.

22. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; and manually operable means carried by said support means for setting the camera either for automatic operation or for flash operation, said manually operable means when setting the camera for flash operation cooperating with said exposure time determining portion of said lever means for rendering said exposure time determining portion inoperative.

23. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion, all of said portions of said lever means being rigidly connected to each other and said lever means forming a unitary member; light-responsive means cooperating with said sensing portion of said lever means for determining the angular position of said lever means prior to exposure of film in the camera, said light-responsive means being carried by said support means and responding to the lighting conditions for determining the angular position of said lever means; and manually operable means carried by said support means for setting the camera either for automatic operation or for flash operation, said manually operable means when setting the camera for flash operation cooperating with said exposure time determining portion of said lever means for rendering said exposure time determining portion inoperative, said exposure time determining portion of said lever means being in the form of a springy, yieldable portion of said lever means and said manually operable means engaging said springy, yieldable portion of said lever means and moving the latter to a position where it does not participate in the determining of the exposure time of the camera when said manually operable means sets the camera for flash operations.

24. In an automatic exposure control assembly for cameras, in combination, support means; lever means for determining the exposure time and exposure aperture of the camera, said lever means being turnably carried by said support means, having an exposure time determining portion, an exposure aperture determining portion, and a sensing portion having a scanning edge, all of said portions of said lever means being rigidly connected to each other and said lever means forming a unitary member; and light-responsive means carried by said support means and including an element automatically assuming a position determined by the lighting conditions and located in the path of movement of said scanning edged sensing portion of said lever means for determining the angular position of said lever means prior to exposure of film in the camera, said exposure time and exposure aperture determining portions of said lever means simultaneously determining the exposure time and exposure aperture.

References Cited in the file of this patent

UNITED STATES PATENTS

| | | |
|---|---|---|
| 2,868,095 | Gebele | Jan. 13, 1959 |
| 2,923,216 | Greger | Feb. 2, 1960 |
| 2,925,760 | Broschke | Feb. 23, 1960 |
| 2,999,440 | Nerwin | Sept. 12, 1961 |